United States Patent
Hummel et al.

(10) Patent No.: US 7,849,287 B2
(45) Date of Patent: Dec. 7, 2010

(54) EFFICIENTLY CONTROLLING SPECIAL MEMORY MAPPED SYSTEM ACCESSES

(75) Inventors: Mark D. Hummel, Franklin, MA (US); Andrew W. Lueck, Austin, TX (US); Andrew G. Kegel, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1059 days.

(21) Appl. No.: 11/559,028

(22) Filed: Nov. 13, 2006

(65) Prior Publication Data

US 2008/0114906 A1    May 15, 2008

(51) Int. Cl.
*G06F 12/00* (2006.01)
(52) U.S. Cl. .................... 711/206; 711/221; 710/26
(58) Field of Classification Search ............... 711/206, 711/221; 710/26
See application file for complete search history.

(56) References Cited

U.S. PATENT DOCUMENTS

| | | | |
|---|---|---|---|
| 4,550,368 A | 10/1985 | Bechtolsheim | |
| 4,802,085 A | 1/1989 | Levy et al. | |
| 4,812,967 A | 3/1989 | Hirosawa et al. | |
| 5,301,287 A | 4/1994 | Herrell et al. | |
| 5,826,084 A | 10/1998 | Brooks et al. | |
| 5,949,436 A | 9/1999 | Horane et al. | |
| 5,956,516 A | 9/1999 | Pawlowski | |
| 5,987,557 A | 11/1999 | Ebrahim | |
| 6,065,088 A | 5/2000 | Bronson et al. | |
| 6,128,684 A | 10/2000 | Okayama | |
| 6,622,193 B1 | 9/2003 | Avery | |
| 6,725,289 B1 | 4/2004 | Waldspurger et al. | |
| 6,886,171 B2 | 4/2005 | MacLeod | |
| 7,155,379 B2 | 12/2006 | Oshins et al. | |
| 7,209,994 B1 | 4/2007 | Klaiber et al. | |
| 7,302,511 B2 | 11/2007 | Jeyasingh et al. | |
| 7,478,327 B1 | 1/2009 | Reid | |
| 7,552,436 B2 | 6/2009 | Brice, Jr. et al. | |
| 2003/0135685 A1 | 7/2003 | Cowan | |
| 2004/0215860 A1 | 10/2004 | Armstrong et al. | |
| 2006/0075146 A1 | 4/2006 | Schoinas et al. | |

(Continued)

OTHER PUBLICATIONS

U.S. Appl. No. 11/559,049, entitled "Filtering and Remapping Interrupts".

(Continued)

*Primary Examiner*—Jared I Rutz
(74) *Attorney, Agent, or Firm*—Lawrence J. Merkel; Meyertons, Hood, Kivlin, Kowert & Goetzel, P.C.

(57) ABSTRACT

In one embodiment, an input/output memory management unit (IOMMU) comprises a control register configured to store a base address of a set of translation tables and control logic coupled to the control register. The control logic is configured to respond to an input/output (I/O) device-initiated request having an address within an address range of an address space corresponding to a peripheral interconnect. One or more operations other than a memory operation are associated with the address range, and the control logic is configured to translate the address to a second address outside of the address range if the translation tables specify a translation from the address to the second address, whereby a memory operation is performed in response to the request instead of the one or more operations associated with the address range.

17 Claims, 9 Drawing Sheets

U.S. PATENT DOCUMENTS

| | | | |
|---|---|---|---|
| 2006/0195848 A1 | 8/2006 | Arndt et al. | |
| 2006/0200616 A1 | 9/2006 | Maliszewski | |
| 2006/0230208 A1 | 10/2006 | Gregg et al. | |
| 2006/0277348 A1 | 12/2006 | Wooten | |
| 2006/0288130 A1* | 12/2006 | Madukkarumukumana et al. | 710/22 |
| 2006/0294277 A1 | 12/2006 | Tetrick | |
| 2007/0079039 A1 | 4/2007 | Raj | |

OTHER PUBLICATIONS

Office Action from U.S. Appl. No. 11/559,049 mailed Mar. 18, 2009.

Office Action from U.S. Appl. No. 11/559,049 mailed Sep. 15, 2009.

Darren Abramson, et al., "Intel Virtualization Technology for Directed I/O," Aug. 10, 2006, Intel Technology Journal, vol. 10, Issue 3, 2006.

Office Action from U.S. Appl. No. 11/559,049 mailed Feb. 3, 2010.

Intel Virtualization Technology for Directed I/O, Intel, Aug. 10, 2006, pp. 179-193.

Mark Hummel, IO Memory Management Hardware goes Mainstream, WinHEC, Apr. 25-27, 2006.

* cited by examiner

| Base Address | Top Address | Operation | Controlling Data |
|---|---|---|---|
| FD_F800_0000 | FD_F8FF_FFFF | Interrupt/EOI | Interrupt Remapping Table |
| FD_F900_0000 | FD_F90F_FFFF | Legacy PIC IACK | I/O Page Tables |
| FD_F910_0000 | FD_F91F_FFFF | System Management | SysMgt, I/O Page Tables |
| FD_F920_0000 | FD_FBFF_FFFF | Reserved | I/O Page Tables |
| FD_FC00_0000 | FD_FDFF_FFFF | I/O Space | IoCtl, I/O Page Tables |
| FD_FE00_0000 | FD_FFFF_FFFF | Configuration | I/O Page Tables |
| FE_0000_0000 | FE_1FFF_FFFF | Extended Configuration /Device Messages | I/O Page Tables |
| FE_2000_0000 | FF_FFFF_FFFF | Reserved | I/O Page Tables |

Fig. 4

| Lint1P | Lint0P | IntCtl[1:0] | NMIP | EIntP | INITP | IntTablePtr [51:6] | IG |
|---|---|---|---|---|---|---|---|

| IntTableLen [3:0] | IV | SysMgt [1:0] | IoCtl [1:0] | DomainID [15:0] | PageTablePtr [51:12] | TV | V |
|---|---|---|---|---|---|---|---|

| Vector[7:0] | Destination[7:0] | DM | RqEoi | IntType[2:0] | SI | R |
160
Fig. 9
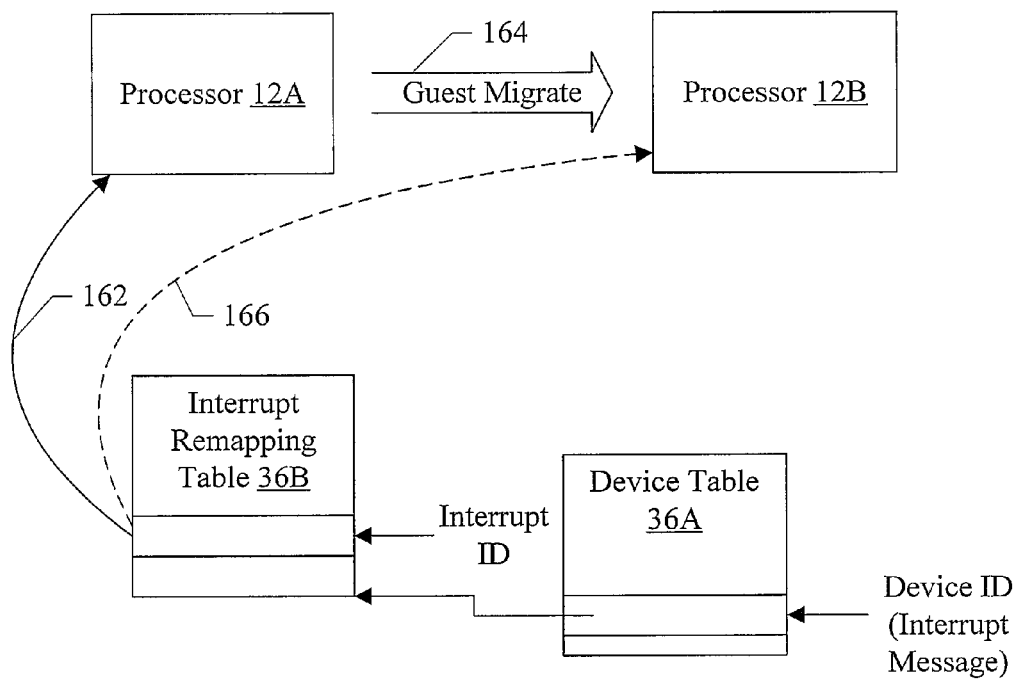
Fig. 10
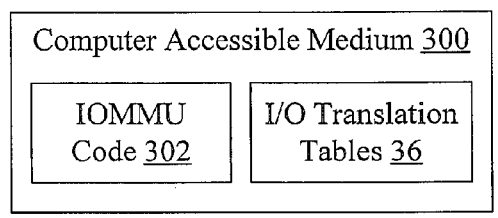
Fig. 11

US 7,849,287 B2

EFFICIENTLY CONTROLLING SPECIAL MEMORY MAPPED SYSTEM ACCESSES

BACKGROUND

1. Field of the Invention

This invention is related to the field of computer systems, and more particularly address translation mechanisms for input/output (I/O) device-initiated requests.

2. Description of the Related Art

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g. read only, read/write, privilege level requirements, etc.). The memory management functionality has a variety of uses: protecting the memory used by each process from unauthorized access by other processes; permitting large virtual spaces to be used by processes even if the physical memory system is not that large; relocation of virtual addresses to available physical memory without the participation of the process; etc.

While the processor addresses are frequently translated, addresses used by input/output (I/O) devices in computer systems are generally not translated. That is, the I/O devices use physical addresses to access memory. In a single operating system (OS) computer system, such as most PCs, the OS controls access to the I/O devices by other processes (applications and OS services). Accordingly, the OS can control which process has access to a given device at any given point in time, and can at least somewhat control the addresses accessed by the device. However, such mechanisms become more complicated and cumbersome in virtual machine systems, which may have multiple guest OSs running on a virtual machine monitor. Additionally, devices' use of physical addresses reduces the overall security of the system, since a rogue device (or a device programmed by a malicious software agent) can access memory unimpeded.

Additional challenges exist on at least some peripheral interfaces to which the I/O devices are connected or over which the devices communicate, directly or indirectly (e.g. through one or more bridges that bridge between peripheral interfaces). An address space associated with the peripheral interface can include one or more address ranges that are assigned operations other than a memory access. That is, while a read or write operation is specified as the command, an address in the address range is interpreted as causing the operation, in addition to or instead of the memory access. For example, interrupts can be signalled through an address range, system management operations can be specified through an address range, etc.

If translation of I/O-generated addresses is to be performed, a mechanism is needed for handling these special address ranges. Additionally, interrupts generated by the I/O devices (e.g. through a special address range, as message signalled interrupts (MSIs), etc.) must be handled correctly.

SUMMARY

In one embodiment, an input/output memory management unit (IOMMU) comprises a control register configured to store a base address of a set of translation tables and control logic coupled to the control register. The control logic is configured to respond to an input/output (I/O) device-initiated request having an address within an address range of an address space corresponding to a peripheral interconnect. One or more operations other than a memory operation are associated with the address range, and the control logic is configured to translate the address to a second address outside of the address range if the translation tables specify a translation from the address to the second address, whereby a memory operation is performed in response to the request instead of the one or more operations associated with the address range.

In an embodiment, a method comprises receiving an input/output (I/O) device-initiated request in an I/O memory management unit (IOMMU), the request having an address within an address range of an address space corresponding to a peripheral interconnect, wherein one or more operations other than a memory operation are associated with the address range; and translating the address to a second address outside of the address range if a set of translation tables identified by a base address programmed into the IOMMU specify a translation from the address to the second address, whereby a memory operation is performed in response to the request instead of the one or more operations associated with the address range. In another embodiment, A method comprises determining if an address range of an address space corresponding to a peripheral interconnect is to be reclaimed for memory operations initiated by an input/output (I/O) device, wherein one or more operations other than a memory operation are associated with the address range; and establishing a translation for a page in the address range, wherein the translation maps the page to a second page outside of the address range if the address range is being reclaimed, wherein the translation is accessible to an I/O memory management unit (IOMMU).

In some embodiments, a system comprises an input/output (I/O) device configured to initiate a request having an address within an address range of an address space corresponding to a peripheral interconnect. One or more operations other than a memory operation are associated with the address range. Coupled to the I/O device, the IOMMU is configured to translate the address to a second address outside of the address range if a set of translation tables identified by a base address programmed into the IOMMU specify a translation from the address to the second address. Thus, a memory operation is performed in response to the request instead of the one or more operations associated with the address range.

BRIEF DESCRIPTION OF THE DRAWINGS

The following detailed description makes reference to the accompanying drawings, which are now briefly described.

FIG. 4 is a table illustrating one embodiment of address ranges for a peripheral address space and the operations associated with those ranges.

FIG. 5 is a block diagram of one embodiment of a device table entry for a device table shown in FIG. 3.

FIG. 9 is a block diagram of one embodiment of an interrupt remapping table entry.

FIG. 10 is a block diagram illustrating use of the interrupt remapping table to have an interrupt follow its associated guest.

FIG. 11 is a block diagram of one embodiment of a computer accessible medium.

Figure 1:
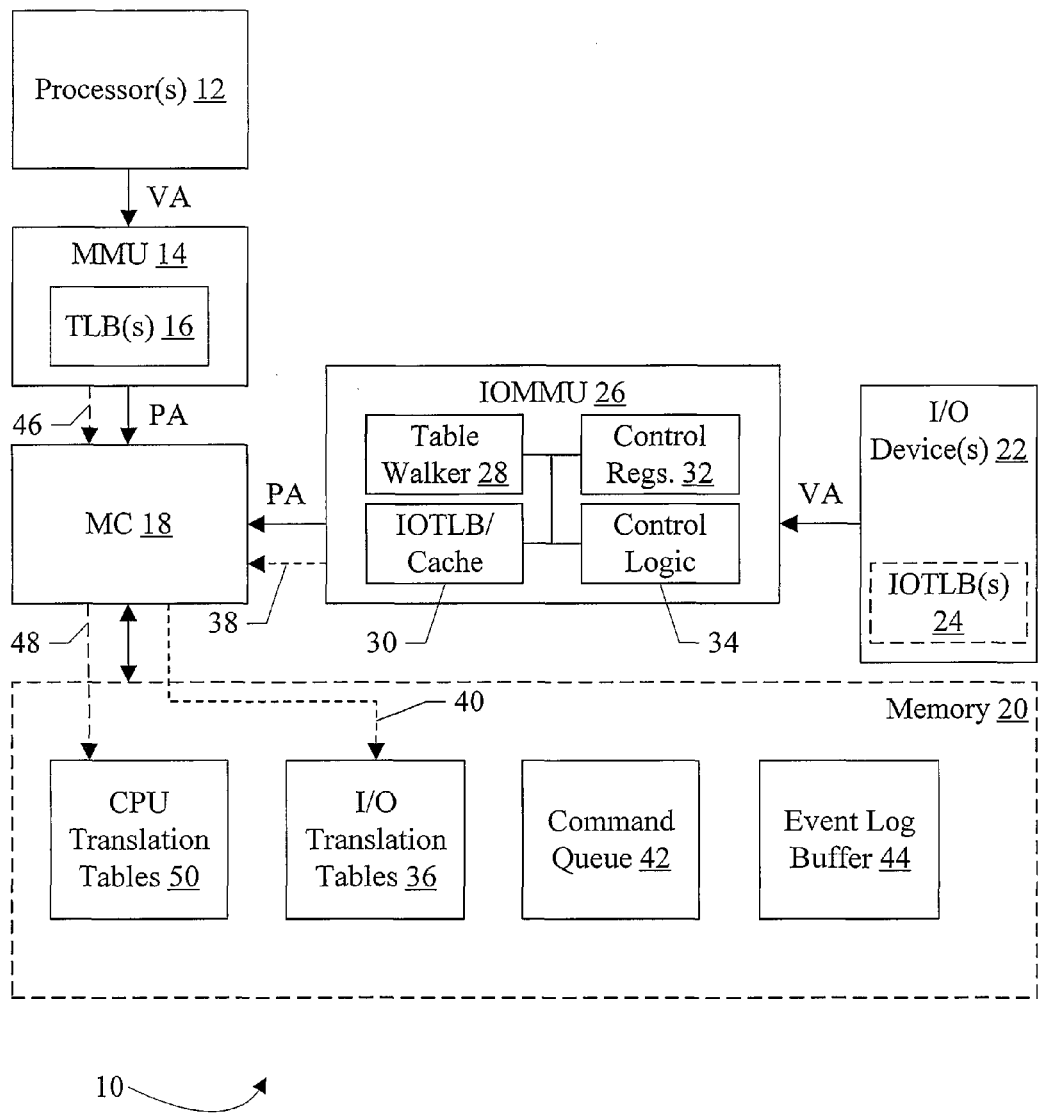
FIG. 1 is a block diagram of a high level view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

FIG. 1 is a block diagram illustrating a simplified, high level view of one embodiment of a computer system 10. In the illustrated embodiment, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, an IOTLB/cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the IOTLB 30, the control registers 32, and the control unit 34 are coupled.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14. Accordingly, the MMU 14 may not provide memory management for the memory requests sourced from the I/O devices 22. Generally, memory management may comprise address translation from a virtual address (VA in FIG. 1) to a physical address (PA in FIG. 1) and memory protection. Memory protection may control read and/or write access to the memory at some level of granularity (e.g. a page), along with various other attributes such as privilege level requirements, cacheability and cache controls (e.g. writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). Other embodiments may not share translation tables between the IOMMU 26 and the MMU 14, as desired.

Generally, the I/O devices 22 may be configured to generate memory requests, such as memory read and write requests, to access memory locations in the memory 20. The memory requests may be part of a direct memory access (DMA) read or write operation, for example. The DMA operations may be initiated by software executed by the processors 12, programming the I/O devices 22 directly or indirectly to perform the DMA operations. Among other things, the I/O devices 22 may be provided with virtual addresses to access the memory 20. The virtual addresses may be translated by the IOMMU 26 to corresponding physical addresses to access the memory, and the physical addresses may be provided to the memory controller 18 for access. That is, the IOMMU 26 may modify the memory requests sourced by the I/O devices 22 to change the virtual address in the request to a physical address, and the memory request may be forwarded to the memory controller 18 to access the memory 20.

The IOMMU uses a set of I/O translation tables 36 stored in the memory 20 to translate the addresses of memory requests from the I/O devices 22. Generally, translation tables may be tables of translation data that can be used to translate virtual addresses to physical addresses. The translation tables may store the translation data in any fashion. For example, in one embodiment, the I/O translation tables 36 may include page tables similar to those defined in the x86 and AMD64™ instruction set architectures. Various subsets of the virtual address bits may be used to index levels of the table, and each level may either be the end of translation (i.e. storing a real page number for the translation) or may point to another table (indexed by another set of virtual address bits). The page may be the unit of translation (i.e. each address in the virtual page translates to the same physical page). Pages may have varying sizes, from 4 kilobytes up to Megabytes or even Gigabytes. Additionally, the translation tables 36 may include a device table that maps devices to sets of page tables (e.g. by device identifier). The device identifier (ID) may be defined in a variety of ways, and may be dependent on the peripheral interconnect to which the device is attached. For example, Peripheral Component Interconnect (PCI) devices may form a device identifier from the bus number, device number and function number. HyperTransport™ devices may use a bus number and unit ID to form a device identifier. Thus, in general, a translation from a virtual address to a physical address may be stored in one or more entries in one or more translation tables, and some of the entries may be shared with other translations. Traversing the tables from entry to entry may be part of identifying the translation for the virtual address. In one embodiment, the translation tables 36 may include an interrupt remapping table to remap interrupts signalled by the I/O devices 22 (e.g. via MSIs, and address range associated with interrupt operations, etc.).

Specifically, the IOMMU 26 illustrated in FIG. 1 may include the table walker 28 to search the I/O translation tables 36 for a translation for a given memory request. The table walker 28 may generate memory requests, e.g. read memory requests, to read the translation data from the translation tables 36. The translation table reads are illustrated by dotted arrows 38 and 40 in FIG. 1.

To facilitate more rapid translations, the IOMMU may cache some translation data. For example, the IOTLB 30 may be a form of cache, which caches the result of previous translations, mapping virtual page numbers to real page numbers and corresponding translation data. If a translation is not found in the IOTLB 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Additionally, other caches may be included to cache page tables, or portions thereof, and/or device tables, or portions thereof, as part of IOTLB/cache 30

The control logic 34 may be configured to access the IOTLB 30 to detect a hit/miss of the translation for a given memory request, and may invoke the table walker. The control logic 34 may also be configured to modify the memory request from the I/O device with the translated address, and to forward the request upstream toward the memory controller. Additionally, the control logic 34 may control various functionality in the IOMMU 26 as programmed into the control registers 32. For example, the control registers 32 may define an area of memory to be a command queue 42 for memory management software to communicate control commands to the IOMMU 26, in this embodiment. The control logic 34 may be configured to read the control commands from the command queue 42 and execute the control commands. Similarly, the control registers 32 may define another area of memory to be an event log buffer 44. The control logic 34 may detect various events and write them to the event log buffer 44. The events may include various errors detected by the control logic 34 with respect to translations and/or other functions of the IOMMU 26.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as PCI, PCI express (PCIe), PCI-X, USB, firewire, SCSI (Small Computer Systems Interface), etc., sound cards, and a variety of data acquisition cards such as GPIB or field bus interface cards, etc. The term "peripheral device" may also be used to describe some I/O devices.

In some cases, one or more of the I/O devices 22 may also comprise an IOTLB, such as IOTLBs 24. These IOTLBs may be referred to as "remote IOTLBs", since they are external to the IOMMU 26. In such cases, the memory requests that have already been translated may be marked in some fashion so that the IOMMU 26 does not attempt to translate the memory request again.

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include TLBs 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

Figure 2:
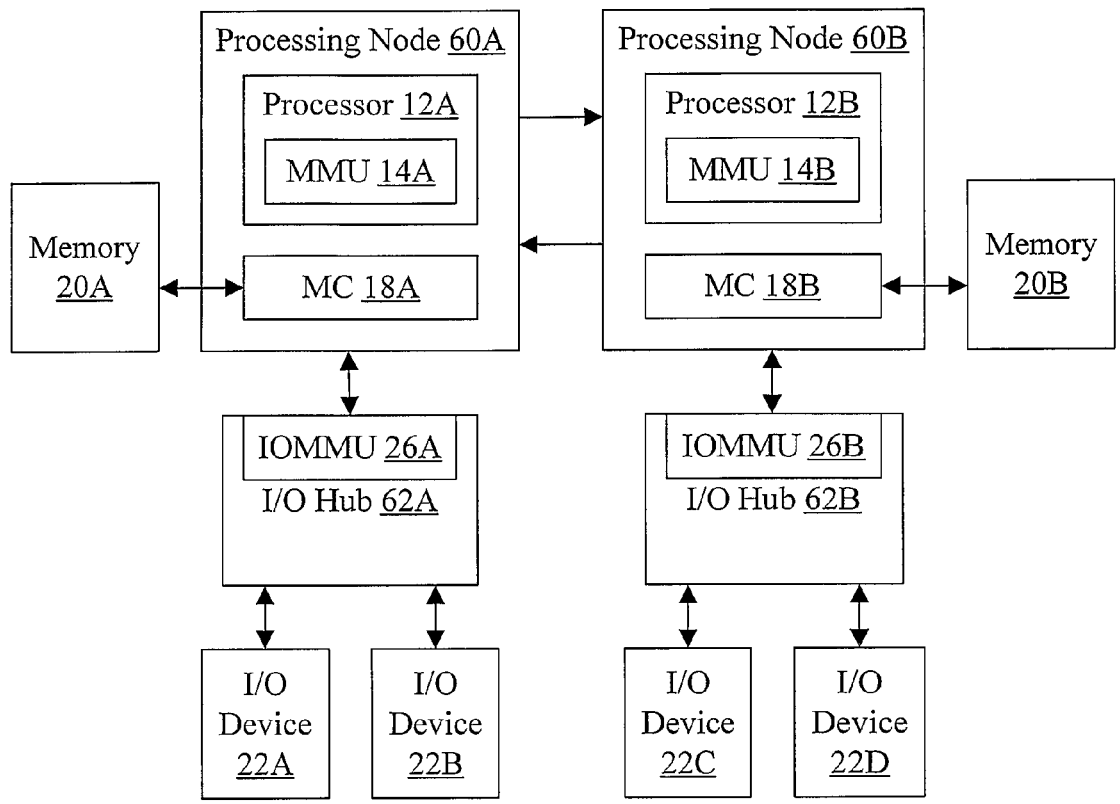
FIG. 2 is a block diagram of a more detailed embodiment of a computer system.

The system 10 illustrates high level functionality of the system, and the actual physical implementation may take many forms. For example, the MMU 14 is commonly integrated into each processor 12. FIG. 2 is one example of a more detailed embodiment. The example illustrated in FIG. 2 may be based on the HyperTransport™ (HT) coherent fabric between processor nodes and the HT I/O link between processor nodes and I/O device or I/O hubs that bridge to other peripheral interconnects. I/O hubs are shown in the example of FIG. 2. Alternatively, any other coherent interconnect may be used between processor nodes and/or any other I/O interconnect may be used between processor nodes and the I/O devices. Furthermore, another example may include processors coupled to a Northbridge, which is further coupled to memory and one or more I/O interconnects, in a traditional PC design.

In the illustrated embodiment, the system 10a comprises processing nodes 60A-60B, which respectively comprise processors 12A-12B further comprising MMUs 14A-14B. The processor nodes 60A-60B also comprise memory controllers 18A-18B. Each of processors 12A-12B may be an instance of a processor 12 as mentioned above. Similarly, each of MMUs 14A-14B and memory controllers 18A-18B may be instances of the MMU 14 and memory controller 18 shown in FIG. 1. In the illustrated embodiment, the MMU functionality is incorporated into the processor.

The system 10a includes a distributed memory system, comprising memories 20A-20B. The physical address space may be distributed over the memories 20A-20B. Accordingly, a given memory request specifying a given address is routed to the memory controller 18A or 18B coupled to the memory 20A or 20B to which that given address is assigned.

Memory requests from the I/O devices (e.g. I/O devices 22A-22D, coupled to I/O Hubs 62A-62B as illustrated in FIG. 2) may not all take the same path to arrive at the memory controller 18A-18B that will service the request. For example, the I/O devices 22A-22B may transmit memory requests to the I/O hub 62A, which transmits the requests to the processing node 60A. If the address of a given memory request is assigned to the memory 20B, the processing node 60A may transmit the given memory request to the processing node 60B, so that the memory controller 18B may receive and process the request. The I/O devices 22C-22D may transmit memory requests to the I/O Hub 62B, which may transmit the requests to the processing node 60B. If the address of a given memory request is assigned to the memory 20A, the processing node 60B may transmit the given memory request to the processing node 60A.

The IOMMU may be placed anywhere along the path between I/O-sourced memory requests and the memory 20. In the illustrated embodiment, IOMMUs 26A-26B are included in the I/O hubs 62A-62B. Thus, any memory requests sourced by an I/O device coupled to the corresponding hub may be translated by the IOMMU in the I/O hub. Other embodiments may locate the IOMMU in different places, from IOTLBs in the I/O devices to IOMMUs within the processing nodes 60A-60B, or even IOMMUs at the memory controllers 18A-18B. Still further, IOMMUs may be located at different points in different parts of the system.

Address Range Reclaiming and Interrupt Remapping

Figure 3:
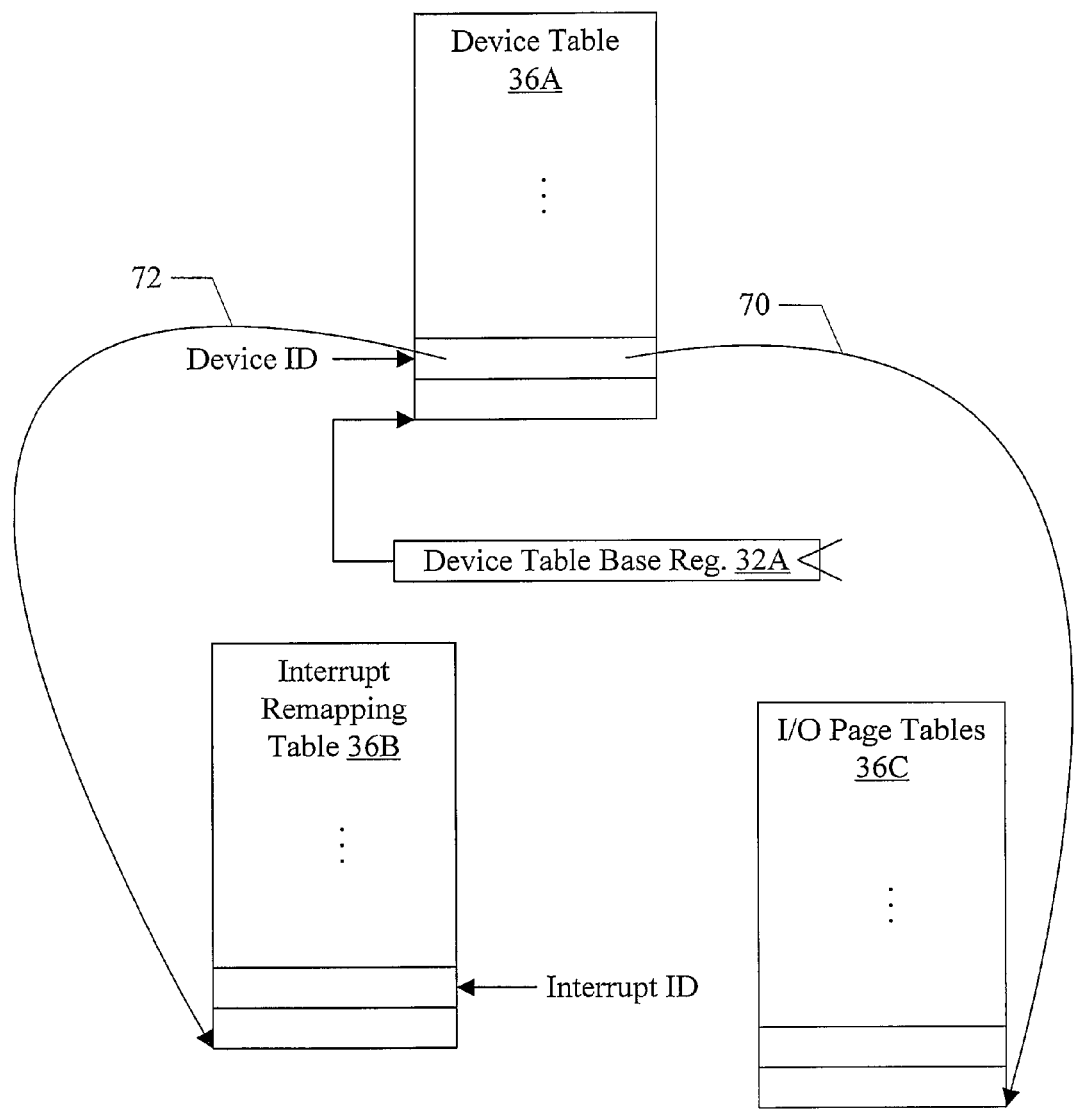
FIG. 3 is a block diagram illustrating a high level structure of one embodiment of the I/O translation tables shown in FIG. 1.

Turning now to FIG. 3, a block diagram is shown illustrating one embodiment of the I/O translation tables 36. Specifically, the translation tables 36 may include a device table 36A, an interrupt remapping table 36B, and a set of I/O page tables 36C. Also shown in FIG. 3 is one of the control registers 32 (control register 32A). The control register 32A may store a base address of the device table 36A.

The device table 36A includes a plurality of entries, indexed by a device ID assigned to the device. Thus, a given device corresponds to one of the entries in the device table 36A (unless the device has multiple device IDs). The entry may include a variety of data. An exemplary entry is shown in FIG. 5 and described in more detail below.

Specifically, the entry may include a pointer to the I/O page tables 36C (represented by arrow 70). The pointer to the I/O page tables 36C may point to a page table that is the starting point for translation searching in the page tables 36C. The starting page table may include pointers to other page tables, in a hierarchical fashion, as mentioned above. The page tables may be indexed by various bits of the virtual address to be translated, according to the implemented translation process.

The entry may also include a pointer to the interrupt remapping table 36B (represented by arrow 72). The interrupt remapping data may be used when an interrupt request is transmitted by a device, and may be indexed by an interrupt ID. The interrupt ID may comprise data that identifies the requested interrupt, and may vary based on the mechanism used to transmit the interrupt request. For example, PCIe defines MSIs, and the interrupt is specified via the MSI data. The MSI data may comprise the interrupt ID. In HT, portions of the address specify the interrupt. The specification information may comprise, e.g., destination (e.g. processor) and vector on that processor. In some embodiments, some or all of the data forming the interrupt ID may be explicitly included in the interrupt request. In other embodiments, some or all of the data may be implicit in the interrupt request (e.g. based on the type of interrupt request, the specific interrupt requested, etc.). In still other embodiments, a combination of explicit and implicit data may be used.

It is noted that, while one device table 36A is shown, multiple device tables may be maintained if desired. The device table base address in the control register 32A may be changed to indicate other device tables. Furthermore, device tables may be hierarchical, if desired, similar to the page tables described above. Similarly, while one interrupt remapping table 36B is shown, there may be multiple interrupt mapping tables, e.g. up to one per entry in the device table 36A. There may also be multiple sets of page tables, e.g. up to one per entry in the device table 36A. It is noted that other embodiments may implement interrupt remapping without I/O translation, and may implement I/O translation (including reclaiming certain address ranges, as described in more detail below) without interrupt remapping.

In one embodiment, at least one peripheral interconnect between the I/O devices 22 and the IOMMU 26 uses one or more address ranges in the address space on that interconnect to specify operations other than the memory operation that would be performed based on the read/write encoding of the command. The operations may be referred to as "special operations" and the corresponding address ranges may be referred to as "special operation address ranges". FIG. 4 illustrates a set of address ranges for HT, and the corresponding special operations associated with each range. Other embodiments may include any set of one or more address ranges and any one or more operations associated with each address range.

Some devices may be known not to generate certain operations mapped to some of the address ranges shown. For example, some devices may not use the legacy programmable interrupt controller (PIC) interrupt acknowledge (IACK) space, because they don't implement the legacy PIC. Some devices may not communicate in the system management space. While devices receive transactions in the configuration or extended configuration spaces, devices frequently don't initiate transactions in the configuration spaces. Devices may not use device messaging. Generally, the devices don't use the reserved spaces.

For such devices, it may be desirable to reclaim those address ranges to be usable as virtual addresses, translated through the page tables to physical addresses outside the corresponding range. For each reclaimed page, a translation may be provided in the translation tables 36 that translates the addresses in that virtual page to physical addresses mapped to the memory 20. Accordingly, the I/O device-initiated requests in those address ranges may be redirected to memory, and may perform normal memory read/write operations instead of the operation(s) assigned to that range. If a given range is used by a given device, translations for pages in that range may be established in the translation tables 36 with a unity mapping. A unity mapping may be a mapping of a virtual address to a physical address that is numerically the same as the virtual address. Pages having a unity mapping may cause the operation(s) assigned to the corresponding address range, instead of the memory operation. It is not necessary that all pages in a given range have the unity mapping or be reclaimed. The decision to reclaim or provide the unity mapping may be made on a page by page basis.

In some cases, it may be desirable to override the translation, through the I/O page tables 36C, for a special operation address range. Control fields in the device table entry for the device may be used for such ranges, as described in more detail below.

In addition to having translations assignable to the address ranges associated with special operations, some I/O devices may have multiple address spaces that are memory-mapped to a larger address space. These regions may have unique properties requiring special handling. Again, if such regions are not in use for a given device, the address ranges may be reclaimed using the translation tables 36.

Turning now to FIG. 4, a table is shown illustrating certain special operation address ranges defined in the HT address space to have certain associated operations other than a read or write, even though the requests transmitted on HT having the addresses may specify a read or write command. By using the address ranges specified, additional command encodings need not be defined on HT to cause the operations listed. However, defining the address ranges and associated operations removes these address ranges from general use as read/write addresses. By permitting these addresses to be translated in the I/O page tables 36C, address ranges not used (or not expected to be used) by a given I/O device may be reclaimed for general use. As long as the address is translated prior to reaching the target that would interpret the address as specifying the special operation, the addresses may be reclaimed. In one embodiment, the target of the ranges is the processor(s) 12.

It is noted that the I/O device that initiates a request may be directly coupled to the peripheral interface on which the address ranges are defined (e.g. the HT interface, in this example), or may be coupled to a different peripheral interface that is bridged to that interface. The bridge circuitry may convert the requests from the non-HT interface to read/write requests with addresses in the corresponding range.

In the table of FIG. 4, the base address and top address of the range are shown, where the range is the set of addresses between the base address and the top address, inclusive. The operation (or operations) assigned to that range are listed in the operation column, and the controlling data in the IOMMU that controls the IOMMU's response to requests from I/O devices in the range is listed in the controlling data column. As can be seen in FIG. 4, each range except for the interrupt/EOI range may be reclaimed for memory operations using the I/O page tables 36C. The interrupt/EOI range is not reclaimed because most I/O devices 22 generate some sort of interrupt. However, other embodiments are contemplated in which the interrupt/EOI range is reclaimable. In reclaimable embodiments, interrupts that are known to be requested by the I/O device may be translated using unity mappings in the I/O page tables 36C.

The interrupt/EOI address range comprises interrupt requests and end of interrupt (EOI) responses to interrupts. Portions of the addresses in the range may be used to specify the particular requested interrupt. For example, some interrupts are a specific address encoding for a specific interrupt. In x86-compatible processors, such interrupts may include system management interrupt (SMI), non-maskable interrupt (NMI), initialization interrupt (INIT), and external interrupt. Additionally, other interrupts are specified as an interrupt vector. The interrupt vector identifies the requested interrupt according to software and/or hardware convention, and may be used to locate the corresponding interrupt service routine (ISR) in memory. That is, the interrupt vector may be a portion of the address, or may be mapped to an offset from a base address of ISRs in memory.

The interrupt/EOI range is not reclaimed through the I/O page tables 36C in this embodiment, but may be remapped by the IOMMU 26 through the I/O interrupt table 36B. Additional details for one embodiment are provided below for interrupt remapping. Additionally, the IOMMU 26 response to certain interrupts (Lint0, Lint1, NMI, external interrupt, and INIT) are controlled by fields in the device table entry for the I/O device (Lint1P, Lint0P, NMIP, EIntP, and INITP).

The legacy programmable interrupt controller (PIC) interrupt acknowledge (IACK) address range may be used for communications related to an interrupt controller that was commonly used in personal computers (PCs) based on x86 processors prior to the advanced programmable interrupt controller (APIC) specification that is currently in use in PCs. Specifically, interrupt acknowledgements required by the legacy PIC may be transmitted in this range. If a legacy PIC, or legacy PIC functionality, is used in a PC, this legacy PIC address range is used for such communication. The legacy PIC IACK address range may be reclaimed through the I/O page tables 36C, since the PIC IACK traffic is only transmitted downstream (from the host to the device).

The system management address range may be used for various system management commands. The commands may include, e.g., commands to cause a processor to go into a power saving mode such as sleep mode, commands to cause the processor to put other devices/system components into various power saving modes, etc. The system management address range may be reclaimed using the I/O page tables 36C, and additional control is provided via the SysMgt field in the device table entry (described in more detail below with regard to FIG. 5).

The two reserved address ranges are generally not used. Accordingly, these ranges may be reclaimed using the I/O page tables 36C. If the reserved address ranges are assigned to operations in the future, unity mappings in the I/O page tables 36C may be used to enable use of the newly-assigned operations.

The I/O space address range may be used for a device to initiate port I/O requests to I/O ports in the system. The I/O space address range may be reclaimed using the I/O page tables 36C, and additional control is provided via the IoCtl field in the device table entry (described in more detail below with regard to FIG. 5).

The configuration and extended configuration ranges are generally used to configure I/O devices 22. However, the devices are typically receivers of configuration reads/writes and thus typically do not initiate requests in that range. Additionally, the extended configuration space overlaps with the device messaging range. Devices that communicate with each other directly, without software intervention, may use the device messaging range for such messages. Both ranges may be reclaimed using the I/O page tables 36C.

While the SysMgt and IoCtl fields are defined in this embodiment for providing additional control for the corresponding address ranges and their operations, other embodiments may provide additional fields for other address ranges, and/or may not provide the SysMgt and IoCtl fields, as desired.

Turning now to FIG. 5, a block diagram of one embodiment of a device table entry 80 is shown. Other embodiments may implement supersets of the fields and other fields, subsets of the fields, or subsets in combination with other fields, as desired. The fields shown in FIG. 5 may be related to interrupt remapping and/or address range reclaiming, and other fields may be provided for other purposes in various embodiments. A field may comprise one or more bits, the encoding of which are assigned particular meanings when interpreted by the IOMMU 26. If a field is a single bit, for this embodiment, it is referred to as a bit. However, multibit fields for similar purposes may be used in other embodiments. Multibit fields are shown with bit ranges in FIG. 5, for this embodiment.

The Lint1P and Lint0P bits may be used to control whether legacy PIC interrupt requests for Lint1 and Lint0 are blocked or passed unmodified by the IOMMU 26. These interrupts are specific addresses in the Interrupt/EOI address range that are associated with the legacy PIC. If these types of interrupt requests are not expected, they may be blocked using the Lint1P and Lint0P bits. Specifically, in this embodiment, the Lint1P and Lint0P bits may be set to permit the corresponding interrupts to pass the IOMMU 26 unmodified, and may be clear to block the corresponding interrupts. In a similar fashion, the NMIP, EIntP, and INITP bits may control the passing or blocking of the NMI, external interrupt, and INIT interrupt, respectively. It is noted that, in this embodiment, SMI is passed unmodified through the IOMMU 26.

The IntCtl field may control how fixed and arbitrated interrupt messages are handled by the IOMMU 26. Encodings of this field may be used to specify that such interrupts are blocked, remapped using the interrupt remapping table 36B, or forwarded unmodified, in one embodiment. If blocked, the IOMMU 26 may target abort the interrupt message.

The interrupt table pointer field (IntTablePtr) may store the base address of the interrupt remapping table 36C (e.g. illustrated as arrow 72 in FIG. 3). The interrupt table length (IntTableLen) specifies the extent of the interrupt table. The interrupt table length field may be encoded for several possible lengths (e.g. 1-2048 entries in powers of two, for one embodiment). The IG bit may be used to indicate whether or not event log entries in the event log buffer 44 are to be created if an I/O page fault is detected for an interrupt message. The interrupt valid (IV) bit may indicate whether or not the Lint0P, Lint1P, IntCtl, NMIP, EintP, INITP, IntTablePtr, IG, and IntTableLen fields are valid. If the fields are not valid, the IOMMU 26 may pass all interrupts unmodified.

The SysMgt field may be encoded to provide further control of communications in the system management range. Specifically, in one embodiment, the SysMgt field may be encoded to: block requests in the range; forward requests in the range unmodified (posted writes only); forward requests that map to INTx messages unmodified (posted writes only); or translate requests using the I/O page tables 36C. The IoCtl field may be encoded to provide further control of communications in the I/O space range. Specifically, in one embodiment, the IoCtl field may be encoded to: block requests in the range; forward the requests unmodified; or translate the requests using the I/O page tables 36C.

The Domain ID is used to tag IOTLB entries and any other cache entries in the IOMMU 26 so that different devices differentiate their translation data. If devices share translation tables, they may have the same Domain ID to share cache/IOTLB entries.

The page table pointer (PageTablePtr) is the pointer to the I/O page tables 36C (e.g. represented by arrow 70 in FIG. 3). The TV bit indicates whether or not the page translation data are valid, and the V bit indicates if the entry 80 is valid.

Figure 6:
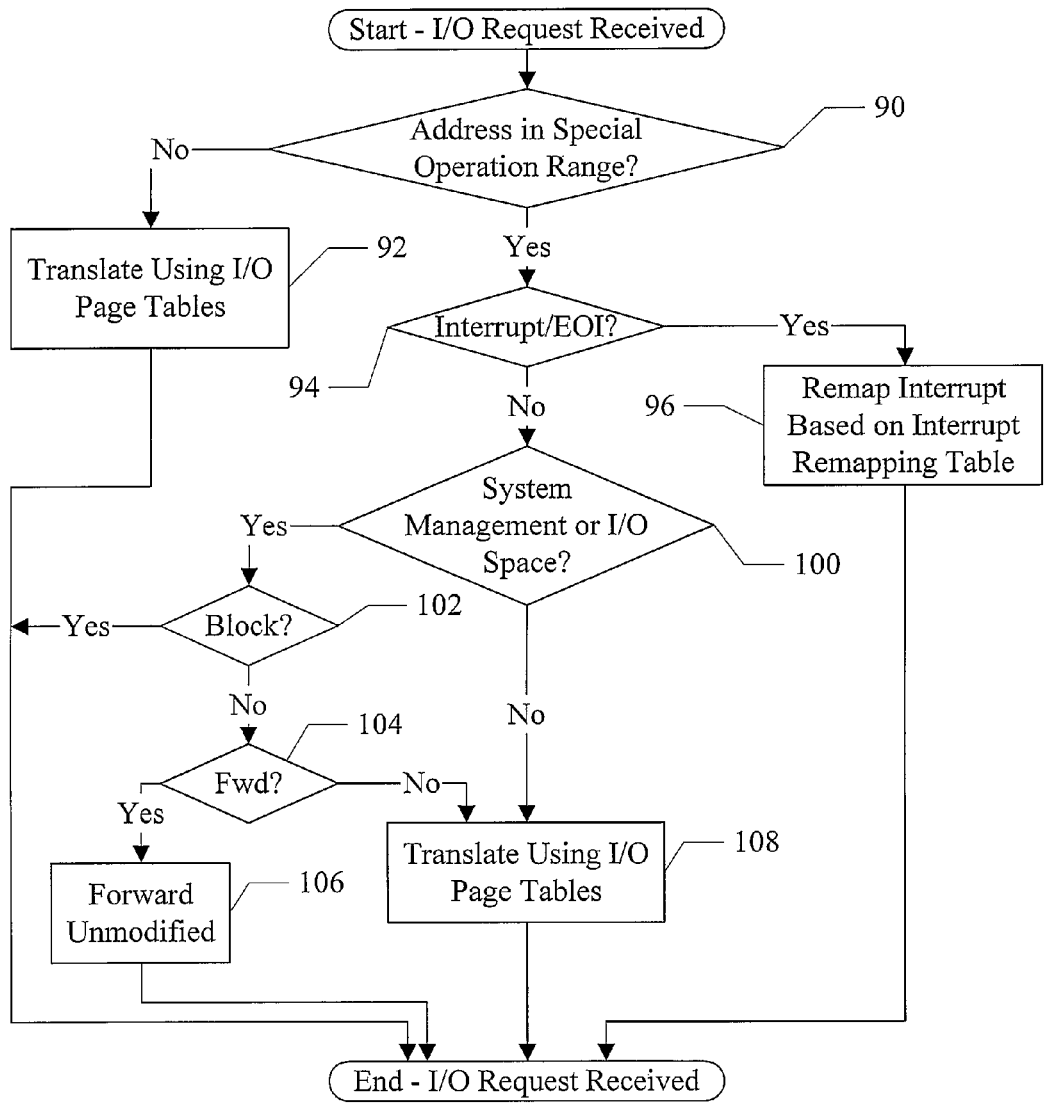
FIG. 6 is a flowchart illustrating operation of one embodiment of an I/O memory management unit (IOMMU) in response to a request from an I/O device.

Turning now to FIG. 6, a flowchart is shown illustrating operation of one embodiment of the IOMMU 26 (and more particularly the control logic 34, for one embodiment) in response to receiving an I/O device-initiated request (or more briefly an I/O request) in the IOMMU 26. While the blocks are shown in a particular order for ease of understanding, any order may be used. Furthermore, blocks may be performed in parallel by combinatorial logic in the IOMMU 26/control logic 34. Blocks, combinations of blocks, and/or the flowchart as a whole may be pipelined over multiple clock cycles.

Figure 6A:
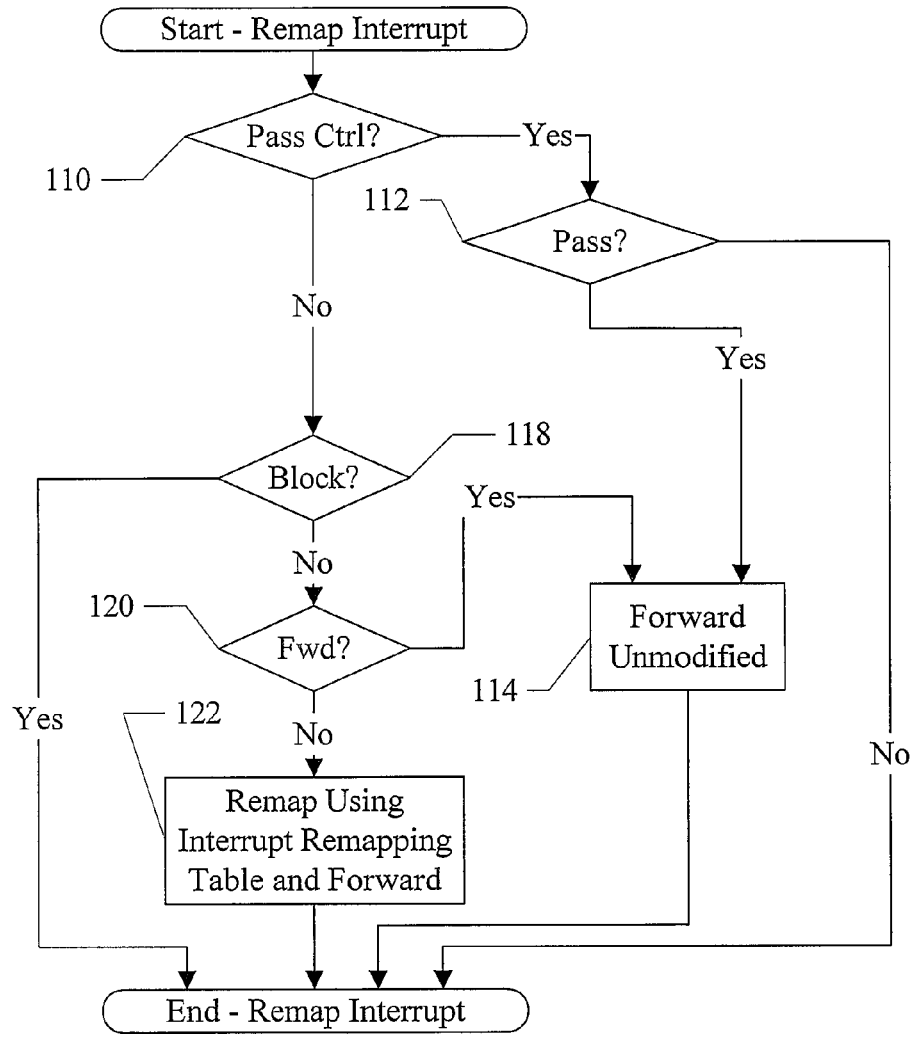
FIG. 6A is a flowchart illustrating interrupt remapping in greater detail.

If the address included in the request is not in an address range associated with a special operation (i.e. an operation other than a memory read/write operation) (decision block 90, "no" leg), the IOMMU 26 may translate the address using the I/O page tables 36C (block 92). If the address is in such a range (e.g., any of the ranges shown in FIG. 4, for one embodiment) (decision block 90, "yes" leg), and the address is in the interrupt/EOI range (decision block 94, "yes" leg), the IOMMU 26 may remap the interrupt based on the interrupt remapping table 36B (assuming the IntCtl field indicates that interrupt remapping is desired) (block 96). More details regarding the interrupt remapping are shown in FIG. 6A and described in more detail below. The remapped interrupt is forwarded by the IOMMU 26 to its destination.

If the address included in the request is in the special address range (decision block 90, "yes" leg) and is not in the interrupt/EOI range (decision block 94, "no" leg), but is in the System Management or I/O space ranges (decision block 100, "yes" leg), the SysMgt or IoCtl field is used to determine if translation is overridden. If the control field indicates that the request is blocked (decision block 102, "yes" leg), the IOMMU 26 may not forward the request. In some embodiments, the IOMMU 26 may abort the request so that the I/O device that initiated the request is informed. In the case of the SysMgt field, the request may be blocked if it is in the system management range or if it is an INTx message, for different encodings of the field. If the control field indicates that the request is forwarded unmodified (decision block 104, "yes" leg), the request is forwarded without translation, or unmodified (block 106). Otherwise, the request may be translated according to the I/O page tables 36C (block 108). Similarly, if the address included in the request is in the special address range (decision block 90, "yes" leg) and is not in the interrupt/EOI range (decision block 94, "no" leg), nor in the System Management or I/O space ranges (decision block 100, "no" leg), the IOMMU may translate the request according to the I/O page tables 36C (block 108). If the translation fails, the IOMMU 26 may take various actions. For example the IOMMU 26 may inform the initiating I/O device of the failure, log the failure in the event log buffer 44, etc. based on various configuration settings, not shown. The translation may fail due to failure to find a device table entry (which may be detected before any of the operation shown in FIG. 6) corresponding to the device, failure to find a translation, finding a translation with insufficient privileges to perform the operation, errors during reads of various data from memory, etc.

Turning now to FIG. 6A, a flowchart is shown illustrating operation of one embodiment of the IOMMU 26 (and more particularly the control logic 34, for one embodiment) for performing interrupt remapping (block 96 in FIG. 6). While the blocks are shown in a particular order for ease of understanding, any order may be used. Furthermore, blocks may be performed in parallel by combinatorial logic in the IOMMU 26/control logic 34. Blocks, combinations of blocks, and/or the flowchart as a whole may be pipelined over multiple clock cycles.

If the requested interrupt is one of the interrupts controlled by specific bits (Lint0, Lint1, NMI, external interrupt, or INIT—decision block 110, "yes" leg), and the corresponding control in the device table entry indicates that the interrupt is passed unmodified (decision block 112, "yes" leg), the IOMMU 26 may forward the interrupt request unmodified (block 114). If the interrupt is not enabled in the device table entry (decision block 112, "no" leg), the interrupt request may be blocked. For example, the interrupt request may be target aborted by the IOMMU 26.

If the requested interrupt is not one of the specifically-controlled interrupts (decision block 110, "no" leg), the IntCtl field may control the response of the IOMMU 26. If the IntCtl field indicates that the interrupts are blocked (decision block 118, "yes" leg), then the request is not forwarded. The request may be target aborted, as mentioned above. If the IntCtl field indicates that the interrupts are forwarded, the interrupt is forwarded without remapping (decision block 120, "yes" leg and block 114). Otherwise, the interrupt is remapped according to the interrupt remapping table 36B and the remapped interrupt request is forwarded (block 122). The flowchart assumes that the I/O remapping data in the device table entry is valid (e.g. that the IV bit indicates valid). If the data is not valid, the remapping may fail. The IOMMU 26 may take various actions if the remapping fails. For example, the interrupt may be ignored, an error may be logged in the event log buffer 44, etc. based on various configuration settings, not shown. Similarly, if an interrupt is blocked, various actions may be taken including one or more of the preceding actions.

Figure 7:
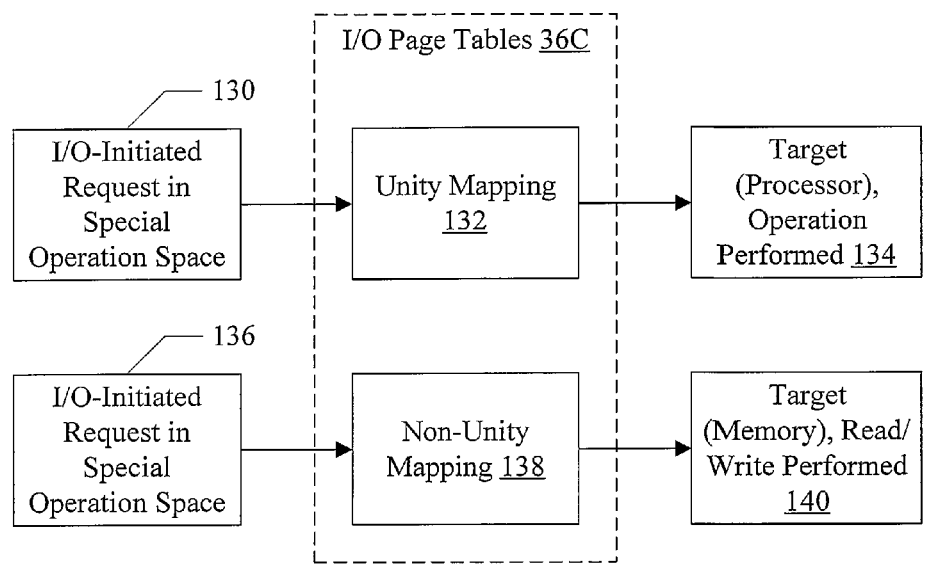
FIG. 7 is a block diagram illustrating one embodiment of mapping I/O requests through the I/O page tables.

Turning now to FIG. 7, a block diagram is shown illustrating the use of the I/O page tables 36C to translate addresses of I/O device-initiated requests in a special operation address range, and selectively maintaining the special operation or causing a memory read/write based on the translation.

As illustrated in FIG. 7, a first I/O device-initiated request may be received by the IOMMU 26 (reference numeral 130). The IOMMU 26 responds to the request by translating the address according to the I/O page tables 36C, and locates a unity mapping translation (reference numeral 132). Thus, the request is forwarded to the target (e.g. a processor) with a physical address equal to the virtual address. The target may recognize the address as causing the special operation, and may perform the operation (reference numeral 134).

On the other hand, a second device-initiated request may be received by the IOMMU 26 (reference numeral 136). The IOMMU 26 responds to the request by translating the address according to the I/O page tables 36C, and locates a non-unity mapping translation (reference numeral 138). Thus, the request is forwarded to the target (e.g. the memory) with a physical address determined from the translation. Since the physical address is in the address range mapped to the memory, a normal read/write memory operation may be performed (reference numeral 140).

It is noted that, while the above discussion mentions forwarding the request to the target (which differs based on the translation), the IOMMU 26 may simply forward the request with the translated address. The request may be detected by both the memory controller and the processor (or other routing circuitry upstream from the IOMMU 26) and either the processor or the memory controller may respond to the operation as appropriate.

Figure 8:
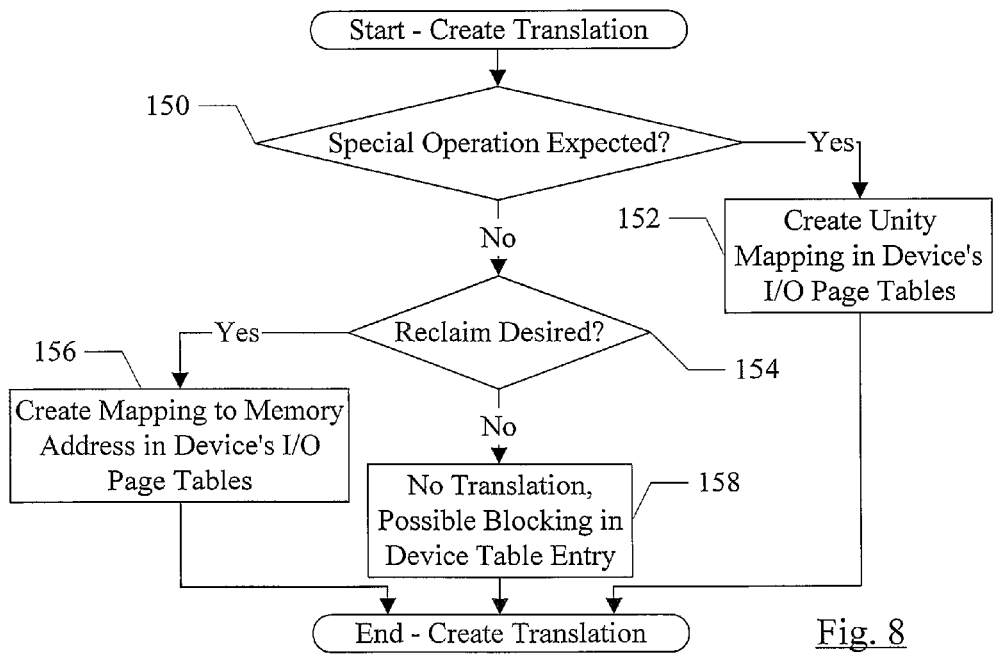
FIG. 8 is a flowchart illustrating one embodiment of creating a translation in the I/O page tables.

Turning now to FIG. 8, a flowchart is shown illustrating operation of IOMMU code 302 (shown in FIG. 11), when executed in the computer system 10 (e.g. on one of the processors 12) to establish translations corresponding to a given I/O device 22. The code may be executed in response to a page fault, during initialization of the system, or at any other time that one or more translations are to be established in the I/O page tables 36C. The IOMMU code may be part of the OS, in some embodiments, and may comprise instructions which, when executed, implement the operation shown for the block or blocks in FIG. 8. While the blocks are shown in a particular order for ease of understanding, other orders may be used.

If the translation is being created for a virtual address in one of the address ranges associated with a special operation, the IOMMU code may determine if the special operation is expected to be initiated by the I/O device (decision block 150). Various information may be taken into account in the decision. For example, PCI-type capabilities blocks may include information on whether or not certain operations may be initiated by the device. The type of device may indicate whether certain operations may be initiated. Any information from any source may be used in the determination. If the operation may be initiated (decision block 150, "yes" leg), a unity mapping may be created in the I/O page tables 36C for each page in the corresponding address range (block 152). If the operation is not expected (decision block 150, "no" leg), the IOMMU code may determine if reclaiming the range for memory operations is desired (decision block 154). Various OS allocation policies, the expected range of addresses to be used by the device, etc., may factor into the decision. If reclaiming is desired (decision block 154, "yes" leg), the IOMMU code may create a translation in the I/O pages tables 36C mapping each page in the range to a memory page (block 156). If no reclaim is desired (decision block 154, "no" leg), no translation may be created for the range. If the range supports blocking of requests, e.g. via a field in the device table entry, the IOMMU code may use the field to create the blocking (block 158).

As mentioned above, the interrupt remapping table 36B may be used to remap interrupts requested by a given device. Generally, the interrupt remapping table entry corresponding to a given requested interrupt may include the information to be supplied to the interrupt handling circuitry to identify the interrupt to which the requested interrupt is remapped. For example, the interrupt handling circuitry may comprises a local APIC in each of the processors 12, in one embodiment.

Many of the interrupt remapping details are provided in the above discussion, for one embodiment. Additional details and various uses thereof are described below.

FIG. 9 is a block diagram of one embodiment of an interrupt remapping table entry 160 that may be used in one embodiment of the IOMMU 26 for an HT-based system. That is, the entry 160 may be an entry in the interrupt remapping table 36B. Other embodiments may implement supersets of the fields and other fields, subsets of the fields, or subsets in combination with other fields, as desired.

The remapped interrupt may be specified by an interrupt vector and destination (Vector and Destination in FIG. 9). Additionally, an interrupt type (IntType in FIG. 9) may be part of the specification of the remapped interrupt. Generally, the interrupt type may be implementation-dependent based on the interrupt structure implemented in the processors 12 and/or the system 10 as a whole. In one embodiment, the interrupt type may comprise one of fixed interrupts (which are the vectored interrupts), arbitrated interrupts (similar to fixed, but not guaranteed to be transmitted to a desired destination). The destination mode (DM) may be specific to APIC, and may specify physical or logical. Other embodiments may not include the destination mode. The RqEoi field may be used to indicate that an end of interrupt message is transmitted to the I/O device. Such interrupts may not be remapped. The SI bit may indicate whether or not so suppress I/O page fault logging for this entry. The remap bit (R) may indicate whether or not the entry is remapped. If the entry is not remapped, the IOMMU 26 may target abort the interrupt message and page fault the request.

The interrupt remapping mechanism, including the interrupt remapping table 36B having entries, e.g., similar to FIG. 9 above, may be used to remap interrupts requested by a given I/O device. Interrupt remapping may be used, in various embodiments, in a variety of ways. For example, if the computer system 10 has a virtualized environment, in which a guest OS is operating within a virtual machine (or guest) managed by a virtual machine monitor (VMM) executing in the computer system, performance may be gained by assigning an I/O device to a given guest OS (at least for a defined period of time) and permitting that guest OS to directly access the I/O device (without interception by the VMM of guest accesses to that I/O device). Such assignment is referred to as direct device assignment. In such a system, interrupts from the I/O device may be processed by the guest OS. To permit the guest OS to migrate to another processor in the system, the interrupt request from the I/O device needs to be delivered to the guest OS on whichever processor it is executing. The interrupt remapping table may facilitate proper delivery of the interrupt.

FIG. 10 is a high level block diagram of an example of such a use. Shown in FIG. 10 are two processors (processors 12A and 12B). The device table 36A is shown, as is the interrupt remapping table 36B. Initially, the guest may be executing on the processor 12A. The interrupt remapping table entry corresponding to a given interrupt from the I/O device that is directly assigned to the guest OS thus includes a remapping of the interrupt that delivers the interrupt to the processor 12A (solid arrow 162). At some point during execution, the VMM or other code determines that the guest is to migrate to the processor 12B (arrow 164). As part of the migration, the code may modify the entry in the interrupt remapping table 36B so that subsequent interrupts are delivered to the processor 12B (dotted arrow 166). Thus, ensuring that the interrupt is properly delivered may be as simple as changing the interrupt remapping table entry for the interrupt and invalidating any cached copies as needed.

In a similar fashion, interrupts may be retargetted from one processor to another in any environment (virtualized or not) to improve performance or to balance load among processors in the system. The interrupt remapping table may provide a generic, centralized mechanism to permit such retargetting.

The interrupt remapping mechanism may also be used to improve security in the computer system. A device may be repurposed to attempt a denial of service attack, or malicious software may control a device to attempt such an attack, but frequently and repeatedly issue interrupt requests from the device. Using the interrupt remapping mechanism, such interrupt requests may be ignored or otherwise prevented from interrupting useful work.

Yet another possible use of the interrupt remapping mechanism may be to make the system 10 more scalable as the number of processors increases. Often, in multi-processing systems, the same interrupt vector number on each processor must have the same interrupt service routine associated with it. In this fashion, a given interrupt targetted at any processor is serviced properly. Using interrupt remapping, such interrupts may be remapped to the same interrupt vector number on a single processor. Each additional processor in the system may provide additional unique interrupt vectors that may be used for other purposes.

It is noted that, while the above description above refers to using various data in the translation tables 36 to translate addresses and/or remap interrupts, such data may be cached in the IOMMU 26 (e.g. the caches and/or IOTLB 30) and/or in remote IOTLBs 24. Wherever translation table data is used, or translations/remapping are performed according to the data, a cached copy of the data or a cached copy of the result of the translation may be used. Direct access to the memory storing the data may not be needed if the data is cached.

Figure 12:
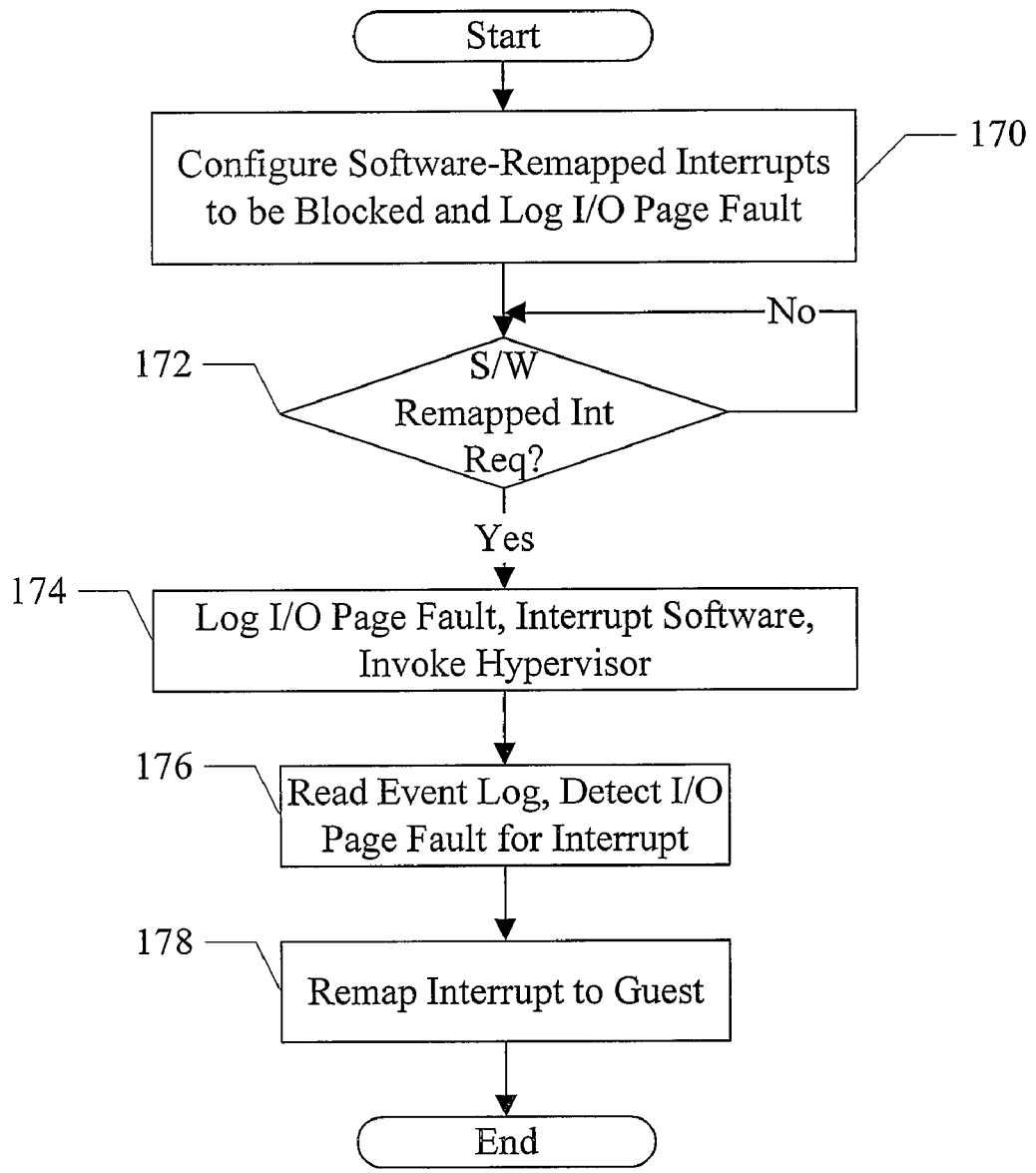
FIG. 12 is a flowchart illustrating one embodiment of software remapping of certain interrupts.

Turning now to FIG. 12, a flowchart is shown illustrating one embodiment of a mechanism for remapping interrupts that are not remapped by the interrupt remapping table. For example, the mechanism may be used to remap the specifically-controlled interrupts (Lint0, Lint1, NMI, ExtInt, and INIT). The mechanism may also be used to expand the interrupt vector space for the fixed/arbitrated interrupts beyond the current 256 vectors. Expanding the vector space may be desired, e.g., in a virtualized environment having several guest operating systems (OSs), each of which may use the 256 vectors in its virtualized environment. The virtualized environment, managed by a Hypervisor, is used in the embodiment of FIG. 12, but other embodiments may use any software to perform the functions associated with the Hypervisor (e.g. an OS).

The Hypervisor may configure the device table entries so that the software-remapped interrupts are blocked and cause an I/O page fault to be logged in the event log buffer 44 (block 170). For example, the Lint0, Lint1, NMI, ExtInt, and INIT interrupts may be blocked using the specific control bits assigned to those interrupts in the device table entry and by clearing the IG bit in the entry. The fixed/arbitrated interrupts may be blocked using the SI and R bits in the corresponding interrupt mapping table entry, or the R bit in combination with the IG bit in the device table entry. Until a software remapped interrupt request is received, the mechanism may be idle (represented by decision block 172, "no" leg). When a software remapped interrupt request is received (decision block 172, "yes" leg), the IOMMU 26 may detect that the interrupt is blocked, and may target abort the interrupt request. The IOMMU 26 may log the I/O page fault for the interrupt request in the event log buffer 44, and interrupt software to invoke the Hypervisor (block 174). The event log buffer entry may include the information used by the Hypervisor to route the interrupt request to the correct guest (e.g. complete address and device ID). The Hypervisor may read the event log from the event log buffer 44 and detect the I/O page fault (block 176). The Hypervisor may remap the interrupt to the appropriate guest for handling (block 178).

Turning next to FIG. 11, a block diagram of one embodiment of a computer accessible medium 300 is shown. Generally speaking, a computer accessible medium may include any media accessible by a computer during use to provide instructions and/or data to the computer. For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link.

In the embodiment of FIG. 11, the computer accessible medium 300 may store one or both of I/O translation tables 36 and IOMMU code 302. The IOMMU code 302 may implement the flowchart of FIG. 8 and/or any other IOMMU code (e.g. creating interrupt remapping tables, modifying the interrupt remappings, etc.). The computer accessible medium 300 may also store code implementing software portions of the flowchart shown in FIG. 12.

Numerous variations and modifications will become apparent to those skilled in the art once the above disclosure is fully appreciated. It is intended that the following claims be interpreted to embrace all such variations and modifications.

What is claimed is:

1. An input/output memory management unit (IOMMU) comprising:

a control register configured to store a base address of a set of translation tables; and control logic coupled to the control register and configured to respond to an input/output (I/O) device-initiated request having an address within an address range of an address space corresponding to a peripheral interconnect, wherein one or more operations other than a memory operation are associated with the address range, and wherein the control logic is configured to translate the address to a second address outside of the address range responsive to the translation tables specifying a translation from the address to the second address, whereby a memory operation is performed in response to the request instead of the one or more operations associated with the address range, and wherein, responsive to the translation tables specifying a unity mapping for the address, the one or more operations corresponding to the address are performed.

2. The IOMMU as recited in claim 1 wherein the set of translation tables comprises a device table pointed to by the base address, wherein the device table comprises a plurality of entries, and a device identifier corresponding to the I/O device that initiated the request specifies a first entry of the device table.

3. The IOMMU as recited in claim 2 wherein the first entry comprises a pointer to a pages table used as a starting point to translate the address.

4. The IOMMU as recited in claim 3 wherein the first entry further comprises a control field corresponding to the address range, wherein the control field specifies whether or not to attempt translation for the address range.

5. The IOMMU as recited in claim 4 wherein the address range is a system management address range.

6. The IOMMU as recited in claim 4 wherein the address range is a I/O space address range.

7. A method comprising:
  receiving an input/output (I/O) device-initiated request in an I/O memory management unit (IOMMU), the request having an address within an address range of an address space corresponding to a peripheral interconnect, wherein one or more operations other than a memory operation are associated with the address range; and
  translating the address to a second address outside of the address range responsive to a set of translation tables identified by a base address programmed into the IOMMU specifying a translation from the address to the second address, whereby a memory operation is performed in response to the request instead of the one or more operations associated with the address range, and wherein the first entry further comprises a control field corresponding to the address range, wherein the control field specifies whether or not to attempt translation for the address range, and wherein the translating is further responsive to the control field specifying that translation is to be attempted for the address range.

8. The method as recited in claim 7 further comprising:
  receiving a second I/O device-initiated request in an I/O memory management unit (IOMMU), the request having a third address within the address range of the address space corresponding to the peripheral interconnect; and
  performing the one or more operations corresponding to the third address responsive to the translation tables specifying a unity mapping for the third address.

9. The method as recited in claim 7 wherein the set of translation tables comprises a device table pointed to by the base address, wherein the device table comprises a plurality of entries and a device identifier corresponding to the I/O device that initiated the request specifies a first entry of the device table.

10. The method as recited in claim 9 wherein the first entry comprises a pointer to a pages table used as a starting point to translate the address.

11. The method as recited in claim 7 wherein the address range is a system management address range.

12. The method as recited in claim 7 wherein the address range is a I/O space address range.

13. A system comprising:
  an input/output (I/O) device configured to initiate a request having an address within an address range of an address space corresponding to a peripheral interconnect, wherein one or more operations other than a memory operation are associated with the address range, and wherein the one or more operations are not expected to be initiated by the device;
  an I/O memory management unit coupled to the I/O device, wherein the IOMMU is configured to translate the address to a second address outside of the address range responsive to a set of translation tables identified by a base address programmed into the IOMMU specifying a translation from the address to the second address, whereby a memory operation is performed in response to the request instead of the one or more operations associated with the address range.

14. The system as recited in claim 13 wherein the I/O device is coupled to the peripheral interconnect.

15. The system as recited in claim 13 wherein the I/O device is coupled to a second peripheral interconnect, the system including one or more bridges between the second peripheral interconnect and the peripheral interconnect.

16. A method comprising:
  determining that an address range of an address space corresponding to a peripheral interconnect is to be reclaimed for memory operations initiated by an input/output (I/O) device, wherein one or more operations other than a memory operation are associated with the address range, and wherein the determining is responsive to an expectation that the one or more operations will not be initiated by the I/O device; and
  establishing a translation for a page in the address range, wherein the translation maps the page to a second page outside of the address range responsive to the address range being reclaimed, wherein the translation is accessible to an I/O memory management unit (IOMMU).

17. The method as recited in claim 16 further comprising establishing a unity mapping for a second page in a second address range associated with a second one or more operations, wherein the second page is not being reclaimed.

* * * * *